United States Patent
Ben-Moshe et al.

(10) Patent No.: US 10,009,982 B2
(45) Date of Patent: Jun. 26, 2018

(54) LIGHT FIXTURE CONNECTABLE DEVICE USEFUL FOR ESTABLISHING A NETWORK INFRASTRUCTURE

(71) Applicant: Ariel-University Research and Development Company Ltd., Ariel (IL)

(72) Inventors: Boaz Ben-Moshe, Herzlia (IL); Nir Shvalb, Nesher (IL)

(73) Assignee: Ariel-University Research and Development Company Ltd., Ariel (IL)

( * ) Notice: Subject to any disclaimer, the term of this patent is extended or adjusted under 35 U.S.C. 154(b) by 0 days. days.

(21) Appl. No.: 15/177,416

(22) Filed: Jun. 9, 2016

(65) Prior Publication Data

US 2016/0286632 A1    Sep. 29, 2016

Related U.S. Application Data

(62) Division of application No. 14/427,727, filed as application No. PCT/IB2013/058481 on Sep. 12, 2013, now Pat. No. 9,374,875.

(60) Provisional application No. 61/725,036, filed on Nov. 12, 2012, provisional application No. 61/699,880, filed on Sep. 12, 2012.

(51) Int. Cl.
| | |
|---|---|
| H05B 37/02 | (2006.01) |
| G01S 1/68 | (2006.01) |
| H01R 33/945 | (2006.01) |
| G01S 5/30 | (2006.01) |
| G01S 11/16 | (2006.01) |
| H01R 43/26 | (2006.01) |
| H04W 4/00 | (2018.01) |
| H04W 4/02 | (2018.01) |
| H04W 4/04 | (2009.01) |
| G01S 1/70 | (2006.01) |
| G01S 1/72 | (2006.01) |

(52) U.S. Cl.
CPC ............ *H05B 37/0272* (2013.01); *G01S 1/68* (2013.01); *G01S 1/70* (2013.01); *G01S 5/30* (2013.01); *G01S 11/16* (2013.01); *H01R 33/945* (2013.01); *H01R 43/26* (2013.01); *H04W 4/008* (2013.01); *H04W 4/025* (2013.01); *H04W 4/043* (2013.01); *G01S 1/725* (2013.01); *H05B 37/029* (2013.01); *H05B 37/0254* (2013.01); *Y02B 20/19* (2013.01); *Y10T 29/49117* (2015.01)

(58) Field of Classification Search
CPC ............ H05B 37/0272; H05B 33/0854; H05B 33/0872; H05B 33/0851; H05B 37/0236; H04W 4/04; H04W 4/02; H04W 4/026; H04W 4/008; H04W 4/025; H04W 4/043
USPC ............ 315/291–326, 209 R, 224, 149–160
See application file for complete search history.

(56) References Cited

U.S. PATENT DOCUMENTS

| | | | | |
|---|---|---|---|---|
| 8,669,716 B2* | 3/2014 | Recker | ............... | H05B 37/0272 315/291 |
| 2012/0262069 A1* | 10/2012 | Reed | ................... | H05B 37/0218 315/130 |
| 2012/0280638 A1* | 11/2012 | Pereira | ............... | H05B 33/0842 315/297 |
| 2013/0026942 A1* | 1/2013 | Ryan | .................. | H05B 37/0272 315/224 |

(Continued)

*Primary Examiner* — Daniel D Chang

(57) ABSTRACT

Disclosed are devices suitable for connection to a light fixture, that in some embodiments are useful as components of a network and/or position-determining system.

20 Claims, 3 Drawing Sheets

(56) References Cited

U.S. PATENT DOCUMENTS

2014/0139120 A1* 5/2014 Chien .................... F21V 19/00
                                                                                 315/155
2015/0028763 A1* 1/2015 Feri ..................... H05B 37/0272
                                                                                 315/210

\* cited by examiner

LIGHT FIXTURE CONNECTABLE DEVICE USEFUL FOR ESTABLISHING A NETWORK INFRASTRUCTURE

RELATED APPLICATIONS

This application is a division of U.S. patent application Ser. No. 14/427,727 filed on Mar. 12, 2015, which is a National Phase of PCT Patent Application No. PCT/IB2013/058481 having International Filing Date of Sep. 12, 2013, which claims the benefit of priority under 35 USC § 119(e) of U.S. Provisional Patent Application No. 61/699,880 filed on Sep. 12, 2012 and 61/725,036 filed on Nov. 12, 2012.

The contents of the above applications are all incorporated by reference as if fully set forth herein in their entirety.

FIELD AND BACKGROUND OF THE INVENTION

The invention, in some embodiments, relates to the field of networks, and more particularly to methods and devices useful for establishing networks. The invention, in some embodiments, relates to the field of location determination, and more particularly to methods and devices useful for location determination of objects, including indoor location determination.

There is often a need for an electronic network in an area, for example, for providing communication, control of various devices associated with the area, or for implementing a location determination system, e.g., to provide Location-Based Services (LBS).

A challenge in the art relates to establishing and maintaining the infrastructure of physical components of a network. The challenge is exceptionally great for location determination systems where there is typically a need for an infrastructure made of many discrete physical components at a relatively high density. The challenge is also exceptionally great when it is desired to retrofit a network infrastructure in an existing area (e.g., a warehouse, a supermarket, a convention center, a mall, a park, an airport) where installation of network infrastructure is prohibitively expensive and disruptive of normal functioning of the area.

SUMMARY OF THE INVENTION

The invention, in some embodiments, relates to the field of networks, and more particularly to methods and devices useful for establishing networks in an area, especially for systems for location identification in the area.

The invention, in some embodiments, relates to the field of location determination, and more particularly to methods and devices useful for location determination of objects, including indoor location determination, for example for implementing the teachings of PCT patent publication WO2013/008169.

Specifically, some embodiments of the invention relate to devices that are relatively quickly and easily deployable in an area, even by relatively unskilled workers, and allow establishment and maintenance of a network, for example, for implementing the teachings of PCT patent publication WO2013/008169. In some embodiments, the devices are configured to be connected to already-present light fixtures, allowing retrofitting of an existing area (e.g., inside a building) with a network or installation of a network in a new area at relatively low cost and relatively easily.

Thus, according to an aspect of some embodiments of the invention, there is provided a device suitable for connection to a light fixture, comprising:
a body configured to be electrically connected to a light fixture;
at least one signal transmitter configured to transmit a signal to an area in the vicinity of the body;
a controller configured to control operation of at least one of an electrical light-emitter connected to the body and/or the at least one signal transmitter, and
at least one of:
the body further configured to allow reversible connection of an electrical light-emitter thereto, allowing electrical connection of a reversibly-connected light-emitter with a light fixture through the device to allow operation of the reversibly-connected light emitter; and/or
further comprising an electrical light-emitter connected to the body as an integral part of the device.

As known in the art of light fixtures and as used herein, light-emitters (such as lightbulbs) are configured to connect with a light fixture by mating through mateable connector components. Connector components typically include a female socket (usually a part of the light fixture) and a male base (usually part of the light-emitter). For example, an E27 connection is made by an E27 base of a standard lightbulb that mates with an E27 socket of a standard light fixture.

As noted above, in some embodiments, a device according to the teachings herein comprises an electrical light-emitter connected to the body of the device as an integral part of the device. Such a light-emitter is any suitable type of light-emitter. In some embodiments, such a light-emitter is selected from the group of light-emitters consisting of incandescent, halogen, fluorescent, compact fluorescent (CFL), cold cathode fluorescent lamp (CCFL), high-intensity discharge, solid state lighting (SSL) and light-emitting diode (LED) light emitters.

In some embodiments, the device is substantially an adaptor configured to be connected, in the usual way through a mateable connection components, to a light fixture (typically a pre-existing light fixture) and to receive a light-emitter, such as a standard lightbulb, where the device has additional utility for implementing networking and location determination. In some such embodiments, the device includes a networked controller chip which is configured to receive control commands from a network and to control the light-emitter, and at least one signal transmitter, which is configured to transmit signals suitable for use in an indoor positioning method, for example as described in PCT patent publication WO2012/008169.

Accordingly and as noted above, in some embodiments the device body is further configured to allow reversible connection of an electrical light-emitter thereto, allowing electrical connection of a reversibly-connected light-emitter with a light fixture through the device to allow operation of the reversibly-connected light emitter to emit light.

In some such embodiments, the device comprises a component of a mateable connection suitable for mating with a base of an electrical light emitter as at least part of the configuration of the body to allow reversible connection of an electrical light-emitter thereto, although typically configuration of the body also includes other electrical and physical components. In some embodiments, such a component is a socket. In some embodiments, such a socket is suitable for mating with a mateable connection base selected from the group consisting of a male screw-connector base, an Edison screw base, a bayonet-connector base, a bipin connector base and a wedge base.

The body may be configured to allow reversible connection of any suitable type of electrical light-emitter. In some such embodiments, configuration of the body to allow reversible connection of an electrical light-emitter thereto is for reversible connection of a light-emitter selected from the group of light-emitters consisting of incandescent, halogen, fluorescent, compact fluorescent (CFL), cold cathode fluorescent lamp (CCFL), high-intensity discharge, solid state lighting (SSL) and light-emitting diode (LED) light emitters.

In some embodiments, the body is an integral part of a light fixture. That said, in some preferred embodiments, the body is configured to be reversibly connected to a light fixture, especially an already-existing, already-installed light fixture, for example in the manner of reversible electrical connection of a light-emitter (such as a lightbulb) to a light fixture. In some such embodiments, the device according to the teachings herein comprises a base suitable for mating with a socket of a light fixture as at least part of the configuration of the body to be reversibly connected to a light fixture. The device may comprise any suitable type of base. In some such embodiments, the base is selected from the group consisting of a screw-connector base (two-way or three-way), an Edison-screw base (two-way or three-way), a bayonet-connector base, a bipin-connector base and a wedge base.

In some embodiments, the body is configured to be allow reversible connection of a first type of electrical light-emitter thereto; and the body is configured to be reversibly connected to a light fixture of the same type. Some such embodiments allow one or more devices according to the teachings herein to be installed in the existing light fixtures of an area without substantially changing the lighting.

In some embodiments, the body is configured to allow reversible connection of a first type of electrical light-emitter thereto; and the body is configured to be reversibly connected to a light fixture of a second type; wherein the first type and the second type are different.

In some embodiments, the body is configured to include a male thread for reversible fitting of the body in a light fixture, and a female thread for reversibly receiving the electrical light-emitter. In some embodiments, the male thread type and the female thread type are the same, such that the light-emitter adaptor is configured to interpose between a light fixture and an electrical light-emitter that would otherwise fit into the light fixture.

In some embodiments, the male thread type and the female thread type are different, such that the body provides an interface between a light fixture suitable to fit an electrical light-emitter of one kind, and an electrical light-emitter of a different kind. For example, in some embodiments the body has an E27 male fitting and an E14 female fitting, and is thereby configured to interface between a light fixture having an E27 female fitting and a light emitter having an E14 male fitting.

For example, in other embodiments the body has an E10 male fitting and an E14 female fitting, and is thereby configured to interface between a light fixture having an E10 female fitting and a light emitter having an E14 male fitting.

As noted above, in some embodiments a device according to the teachings herein comprises a controller configured to control operation of at least one of an electrical light-emitter connected to the body and/or the at least one signal transmitter.

In some embodiments, the controller is configured to control operation of an electrical light-emitter connected to the body (integral with the device or reversibly connected to the device), for example turning on, turning off and dimming the light-emitter.

In some embodiments, the controller is configured to control the signal transmitter to transmit signals suitable for use in implementing a network in an area in the vicinity of the body. In some embodiments, the controller is configured to control the signal transmitter to transmit signals suitable for use in implementing an indoor positioning method in an area in the vicinity of the body, for example as described in PCT patent publication WO2012/008169. In some embodiments, the controller comprises a computer chip. In some embodiments, the controller comprises a digital processor.

In some embodiments, the controller is configured to receive and act upon a command for controlling a connected electrical light-emitter and/or the at least one signal transmitter via a control network. In some such embodiments, the control network is selected from the group consisting of a Phase Locked Loop (PLL) and a wireless communication network [such as a WiFi network, a Bluetooth® network, a GSM network, a LTE network, a WiMax network, a DECT network, or a WCDMA network.

In some embodiments, the controller is configured to receive and act upon at least one command selected from the group consisting of: a command for activating or deactivating a light-emitter connected to the device; a command for changing the identity or profile of a light-emitter connected to the device; a command for troubleshooting a light-emitter connected to the device; a command for synchronizing a signal transmitter with at least one other signal transmitter of a device controlled by the network; and a command for changing a signal transmission schedule.

As noted above, in some embodiments a device according to the teachings herein comprises at least one signal transmitter configured to transmit a signal to an area in the vicinity of the body.

In some embodiments, at least one signal transmitter comprises a wireless electromagnetic radiation signal transmitter.

In some such embodiments, at least one signal transmitter comprises a WiFi transmitter and the controller is configured (inter alia) to control the WiFi transmitter to transmit according to a WiFi protocol. In some such embodiments, the controller is configured to add information to a transmitted WiFi beacon signal, for example by beacon stuffing. In some such embodiments, the information comprises a signal transmission schedule.

In some such embodiments, at least one signal transmitter comprises a Bluetooth® transmitter and the controller is configured (inter alia) to control the Bluetooth® transmitter to transmit according to a Bluetooth® protocol.

In some such embodiments, at least one signal transmitter comprises a source of infrared light and the controller is configured (inter alia) to control the source of infrared light to generate a modulated infrared signal.

In some such embodiments, at least one signal transmitter comprises a source of UV-visible light and the controller is configured (inter alia) to control the source of UV-visible light to generate a modulated UV-visible light signal. For example, in some embodiments, modulation comprises a flicker (e.g., intensity burst) of the light from the UV-visible light source. In some such embodiments, the flicker is shorter than 0.01 seconds. In some such embodiments, the flicker is shorter than 0.001 seconds. In some embodiments, the source of UV-visible light that is controlled to generate a modulated light signal is the light-emitter as described above, that is also used for illumination. In some embodiments, the source of UV-visible light that is controlled to generate a modulated light signal is a different light-emitter, different from the light-emitter as described above, that is also used for illumination.

In some embodiments, the signal transmitter comprises a sound source and the controller is configured to control the sound source to generate a modulated sound signal, typically a modulated sound signal having a base frequency. In some embodiments, the sound signal is inaudible to human, In some embodiments, the base frequency is in the range of 18 kHz and 24 kHz. In some embodiments, the base frequency is in the range of 21 kHz and 24 kHz. In some embodiments, the duration of such a sound-signal is not more than 100 microseconds. In some embodiments, the duration of such a sound-signal is not more than 50 microseconds. In some embodiments, the duration of such a sound-signal is not more than 20 microseconds. In some embodiments, the duration of such a sound signal is not less than 0.1 microseconds. In some embodiments, the duration of such a sound-signal is in the range of 1 and 10 microseconds.

In some embodiments, the controller is configured to activate the signal transmitter periodically. In some embodiments, the controller is configured to activate the signal transmitter intermittently. In some embodiments, the controller is configured to activate the signal transmitter at times designated according to a signal transmission schedule.

In some embodiments, the controller is configured to optionally activate the signal transmitter to transmit a general broadcasting signal. In some such embodiments, the general broadcasting signal comprises information such as commercials, updates, security notifications and the like.

In some embodiments, a device according to the teachings herein further comprises a signal receiver. In some embodiments the signal receiver is configured to receive signals transmitted by a signal transmitter of a different such device.

In some embodiments, the signal receiver is configured to receive the same type of signal as the signal transmitter is configured to transmit.

In some such embodiments, the signal receiver is configured to receive sound signals and the signal transmitter is configured to transmit sound signals.

In some such embodiments, the signal receiver is configured to receive infrared signals and the signal transmitter is configured to transmit infrared signals.

In some such embodiments, the signal receiver is a WiFi receiver and the signal transmitter is a WiFi transmitter. In some such embodiments, the device is further configured to function as a WiFi access point. In some such embodiments, the the controller, signal receiver and signal transmitter are together configured to function (inter alia) as a WiFi access point.

In some embodiments, the signal receiver is configured to receive a type of signal different from the signal type the signal transmitter is configured to transmit.

In some embodiments, the signal receiver is a WiFi receiver and the signal transmitter is configured to transmit sound signals. Some such embodiments are suitable for implementing the teachings of PCT publication WO2013/008169.

In some embodiments, the controller is configured, upon malfunction of at least one component of the device, to use the signal transmitter to transmit an error signal; and the controller is configured, upon receipt of such an error signal from a different such device, to operate in place of the different device.

In some embodiments, the device according to the teachings herein is configured to draw electricity, when electrically connected to a light fixture, from a light fixture for powering at least some of the device components in addition to powering a light emitter. In some embodiments, at least one such component is selected from the group consisting of the signal transmitter, the controller and, if present, the signal receiver.

In some embodiments, the device further comprises an electricity storage unit configured to store electricity for powering at least some of the device components. In some embodiments, at least one such component is selected from the group consisting of the signal transmitter, the controller and, if present, the signal receiver. In some embodiments, the electrical storage unit is at least one electricity storage unit selected from the group consisting of a battery, a rechargeable battery and a capacitor. In some embodiments, the device is configured to draw electricity from the electricity storage unit for powering at least some of the components when no power is available from a the light fixture, for example during a power outage.

In some embodiments, the device further comprises a clock. In some embodiments the clock is used to help synchronize the controller with the controllers of other such devices, for example using a synchronization protocol such as IEEE 1588.

Some embodiments of devices according to the teachings herein are useful as infrastructure components for a network or a system for location determination in an area.

Thus, according to an aspect of some embodiments of the invention, there is also provided a network infrastructure in an area, comprising: at least two devices suitable for connection to a light fixture according to the teachings herein, deployed in an area by electrical connection to light fixtures located in the area.

Thus, according to an aspect of some embodiments of the invention, there is also provided system for location determination in an area, comprising: at least two devices suitable for connection to a light fixture according to the teachings herein, deployed in an area by electrical connection to light fixtures located in the area.

Some embodiments of the devices according to the teachings herein allow quick, simple and easy-to-maintain installation of infrastructure components for a network or a system for location determination in an area, for example, by connecting to light fixtures in the area.

Thus, according to an aspect of some embodiments of the invention, there is also provided a method of deploying a network infrastructure in an area, comprising: providing at least two devices suitable for connection to a light fixture according to the teachings herein; and electrically connecting the devices to light fixtures in the area.

Thus, according to an aspect of some embodiments of the invention, there is also provided a method of making a system for location determination in an area, comprising: providing at least two devices suitable for connection to a light fixture according to the teachings herein; and electrically connecting the devices to light fixtures in the area.

In some embodiments of the methods, network infrastructure and system, the light fixtures in the area are pre-existing light fixtures.

In some embodiments of the methods, network infrastructure and system, the light fixtures in the area are a part of a physical structure in the area.

In some embodiments of the methods, network infrastructure and system, the area is indoors. In some embodiments, the area is selected from the group consisting of a warehouse, a supermarket, a convention center, a mall, an indoor parking garage, and an airport.

In some embodiments of the methods, network infrastructure and system, the area is outdoors, and in some embodiments, at least one light fixture is a street lamp. In some embodiments, the area is selected from the group consisting of a parking lot, a park or a street.

According to an aspect of some embodiments of the invention, there is also provided a method for location determination in an area, substantially as described herein.

Aspects of some embodiments of the teachings herein relate to location determination in a specified area. Methods and devices useful for understanding some aspects of the teachings herein, and/or for assisting a person having ordinary skill in the art to implement some of aspects of the teachings herein are described in PCT patent application IB2012/053499 filed 9 Jul. 2012 and published on 17 Jan. 2013 as WO2013/008169. Prior to publication, the PCT patent application in its entirety was included as an Appendix in U.S. Provisional Patent Applications No. 61/699,880 filed 12 Sep. 2012 and 61/725,036 filed 12 Nov. 2012, the priority documents of the instant application, inter alia, providing enabling support for some aspects of the invention. Since WO2012/008169 has been published, it is hereby included by reference as if fully set-forth herein. By this inclusion, no new matter has been added.

Unless otherwise defined, all technical and scientific terms used herein have the same meaning as commonly understood by one of ordinary skill in the art to which the invention pertains. In case of conflict, the specification, including definitions, take precedence.

It is important to note that as used herein, an electrical light-emitter is a light-emitter suitable for and configured to have an illumination output sufficient to function in the manner of an area-lighting element such as a lightbulb. In some embodiments, the illumination output of the light-emitter is at least 200 lumen (about that of a 25 W incandescent lightbulb), in some embodiments at least 350 lumen (about that of a 35 W incandescent lightbulb) and in some embodiments at least 500 lumen (about that of a 40 W incandescent lightbulb).

In some embodiments, the divergence of light produced by a light-emitter according to the teachings herein is at least about 5 degrees. In some embodiments, the divergence of light produced by a light-emitter according to the teachings herein is at least about 10 degrees. In some embodiments, the divergence of light produced by a light-emitter according to the teachings herein is at least about 20 degrees. In some embodiments, the divergence of light produced by a light-emitter according to the teachings herein is at least about 60 degrees. In some embodiments, a light-emitter according to the teachings herein is configured to illuminate at least a hemisphere.

As used herein a light fixture (also called a light fitting) is an electrical device useful for illuminating an area using an electrical light emitter. It is appreciated that in the context of the present application, the term light fixture relates to any source of electricity which can be used to power a lightbulb or other light emitting element, such as an overhead light fixture, a chandelier, a lamp, or an electrical socket. Typically, a light fixture has a fixture body and is configured (e.g., includes a light socket) to be allow reversible connection of an electrical light-emitter (e.g., lightbulb) thereto, allowing electrical association of a connected light-emitter with a light fixture to allow operation of the light emitter and allows simple replacement of the light-emitter.

Some embodiments of the teachings herein include a base or a socket component of a known light-fixture/light emitter connector.

In some such embodiments the connector component is of an Edison-screw connector, e.g., E5, E10, E11, E12, E14, E17, E26, E27, E29, E39, E40 or skirted Edison-screw connector.

In some such embodiments the connector component is of a bayonet-connector, e.g., BA5s, BA7s, BA9s, BA9s, B15d, BA15d, BA15s, BAY15d, BAX15s, BA15s, BA20d, BA20s, BA21d, B21-4, B21s-4, B22d, BY22d, B22d-3, BX22d, B24s-3, BC-3 or GZ10 or fluorescent T2, T4, T5, T8, T9, T10, T12, T17 or PG17.

In some such embodiments the connector is of a bipin-connector, e.g., G4, GU4, GY4, GZ4, G5, G5.3, G5.3-4.8, GU5.3, GX5.3, GY5.3, G6.35, GX6.35, GY6.35, GZ6.35, G8, GY8.6, G9, G9.5, GU10, G12, G13, G23, GU24, G38 or GX53.

In some such embodiments, the connector is of a wedge connector, e.g., W2.1×9.5d or W2.5×16q.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein, when a numerical value is preceded by the term "about", the term "about" is intended to indicate +/−10%.

Some embodiments of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general-purpose computers or processors. In some embodiments, some components are dedicated or custom components such as circuits, integrated circuits or software. For example, some embodiments are performed, at least partially, as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network (e.g., Internet, Intranet, wired, wireless) connection. In some embodiments, implementation includes a user interface, generally comprising one or more of input devices (e.g., allowing input of commands and/or parameters) and output devices (e.g., allowing reporting parameters of operation and results).

The teachings herein may be implemented using standard techniques known to a person having ordinary skill in the art of electronics, communications and networking upon perusal of the disclosure and of PCT publication WO2013/008169.

BRIEF DESCRIPTION OF THE SEVERAL VIEWS OF THE DRAWINGS

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted are not to scale. In the Figures.

DESCRIPTION OF SPECIFIC EMBODIMENTS OF THE INVENTION

Figure 1A:
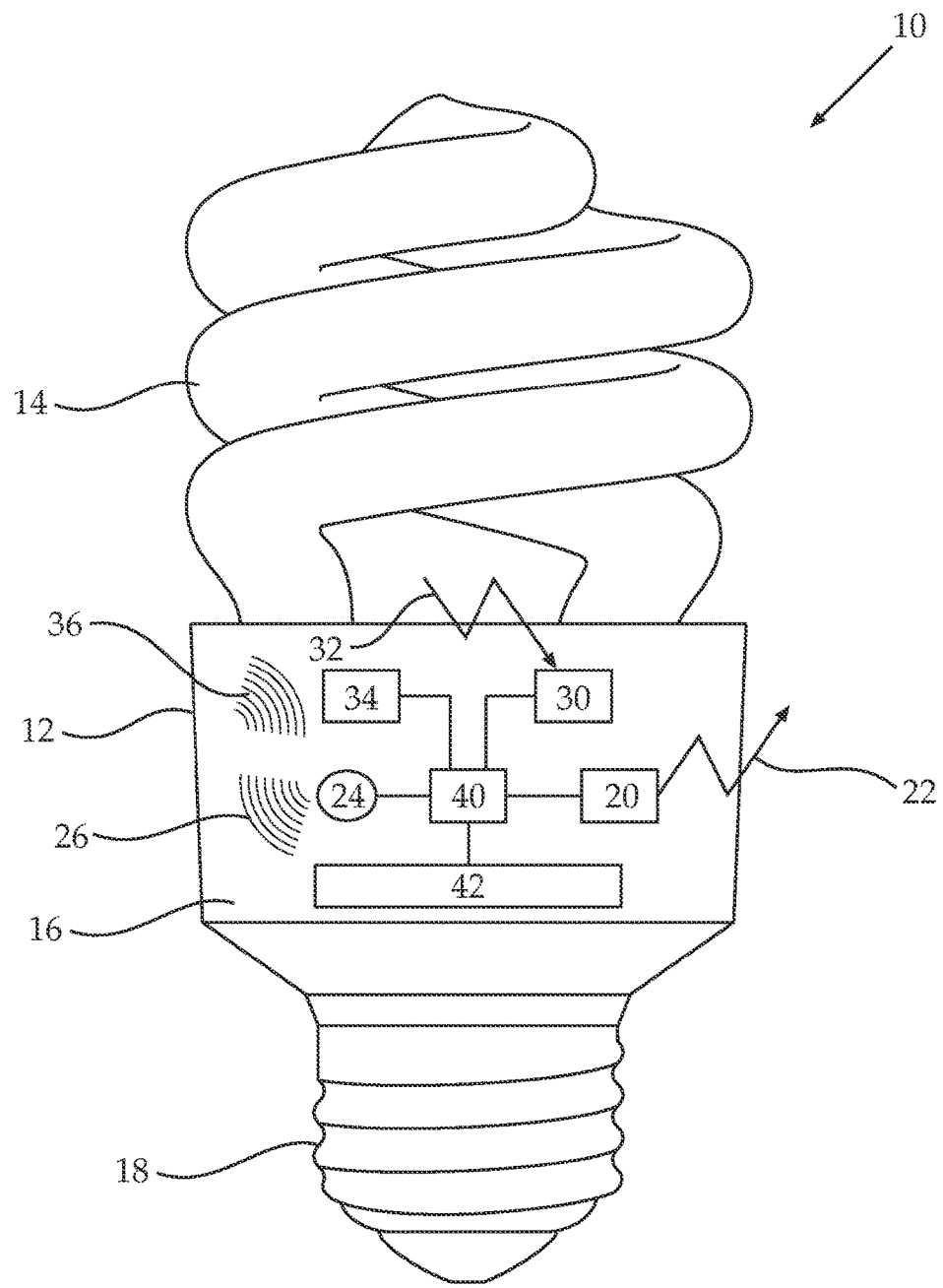
FIG. 1A is a schematic depiction of a device according to the teachings herein comprising an integral electrical light-emitter.

The invention, in some embodiments, relates to the field of networks, and more particularly to methods and devices useful for establishing networks.

The invention, in some embodiments, relates to the field of location determination, and more particularly to methods and devices useful for location determination of objects, including indoor location determination, for example for implementing the teachings of PCT patent publication WO2013/008169.

Thus, according to an aspect of some embodiments of the present invention, there is provided a device suitable for connection to a light fixture, comprising:

a body configured to be electrically connected to a light fixture;

at least one signal transmitter configured to transmit a signal to an area in the vicinity of the body;

a controller configured to control operation of at least one of an electrical light-emitter connected to the body and/or the at least one signal transmitter, and at least one of:

the body further configured to allow reversible connection of an electrical light-emitter thereto, allowing electrical connection of a reversibly-connected light-emitter with a light fixture through the device to allow operation of the reversibly-connected light emitter; and/or further comprising an electrical light-emitter connected to the body as an integral part of the device.

In some embodiments, the invention relates to a light-emitting device comprising a standard CFL lightbulb, which has been modified to include a networked controller chip which is configured to receive control commands from a network controlling the lightbulb, and at least one signal transmitting component, which is configured to transmit signals suitable for use in an indoor positioning method, for example as described in PCT patent application WO2013/008169 of the Applicant.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

Reference is now made to FIG. 1A, which is a schematic depiction of a device suitable for connection to a light fixture according to the teachings herein that further comprises a light emitter that is an integral part of the device.

As seen in FIG. 1A, a device 10 can be considered a lightbulb 12 (here depicted as a Compact Fluorescent Light (CFL) bulb) which constitutes a light-emitter 14 configured to emit light to illuminate an area in which device 10 is installed, a body (in the priority documents, sometimes called base) 16 associated with light-emitter 14, body 16 configured to be electrically connected to a standard E27 light fixture through a connecting element 18 (base of E27 connector) as done in regular use of a prior art lightbulb for illumination.

Though light-emitter 14 in the illustrated embodiment is a CFL bulb, any type of electrical light-emitter 14 may be used in accordance with the teachings herein. For example, light emitter 14 may be an incandescent lightbulb, a halogen lightbulb, a fluorescent lamp, a compact fluorescent lamp (CFL), a cold cathode fluorescent lamp (CCFL), a high-intensity discharge lamp, a light-emitting diode (LED), or any other lamp or lightbulb powered by electricity to illuminate an area.

Mounted onto or within body 16, is at least one signal transmitter 20 and 24, here shown as two signal transmitters: an electromagnetic radiation signal transmitter 20 configured to transmit a wireless electromagnetic radiation signal 22, and a sound source 24 configured to transmit a sound signal 26.

In some embodiments, lightbulb 12 has mounted thereon at least one signal receiver, here shown as a two signal receivers: an electromagnetic radiation signal receiver 30 configured to receive wireless electromagnetic radiation signals 32, and a sound receiver 34 configured to receive a sound signal 36.

Electromagnetic radiation signal transmitter 20 and electromagnetic radiation receiver 30 may transmit and/or receive any type of electromagnetic radiation signals, including WiFi signals, Bluetooth® signals, infrared radiation signals, and radio signals.

In some embodiments, signal transmitters 20 and 24 are configured to broadcast universally-accessible (i.e., not addressed to a specific receiver) information-carrying signals. Such broadcast signals may include information intended for recipients of the signals, such as advertisements, updates such as updates to train or flight schedules, or security notifications, for example provided by a local security authority or fire department.

In some embodiments, device 10 is configured so that the transmitted signal is transmitted by modulated visible light. In some such embodiments, device 10 is configured to modulate light from light-emitter 14 by flickering, that is to say, varying the intensity of the light produced by light-emitter 14 as a function of time, periodically, or intermittently to carry desired information. Preferably, such flickering is of sufficiently low amplitude and sufficiently rapid rate to not be a nuisance or cause irritation to people in the vicinity of device 10, but is detectable by a suitable light detector (e.g., a camera), to allow acquisition of data from the modulated light signal, for example by a camera of a smartphone.

A controller 40, mounted onto or within body 16, is configured to control the operation of light emitter 1, and signal transmitters 20 and 24. In some embodiments, controller 40 is configured to receive a control command from a control network (not shown). In some embodiments, the control network is a Phase Locked Loop (PLL). In some embodiments the control network is a wireless communication network, such as a WiFi network, a Bluetooth® network, or a GSM network, a LTE network, a WiMax network, a DECT network, or a WCDMA network.

In some embodiments, an operator transmits the control command over the control network to controller 40. In some embodiments, controller 40 receives a suitable control command from a signal received over the control network, for example when different device such as 10 in the network transmits a control command to controller 40 of device 10.

Typical such commands include command for activating or deactivating light-emitter 14. In some embodiments, such commands comprise commands for synchronizing one or more of signal transmitters 20 and 24 with at least one other signal transmitter (e.g., of different device similar to 10) controlled by the network. In some embodiments, such commands comprises a command for changing the transmission schedule of signals transmitted by one or both of transmitters 20 and 24. In some embodiments, such commands comprise commands for changing the identifier or profile of the device 10 in the network. In some embodiments, such commands comprise commands for troubleshooting or diagnostics of device 10.

In some embodiments, device 10 also comprises an electricity storage unit (energy source) 42, such as a battery, mounted onto or within body 16, and configured to supply electrical power to signal transmitters 20 and 24, signal receivers 30 and 34, and controller 40, particularly at times when electrical current provided by a light fixture through element 18 is unavailable, such as during a power outage.

As will be described in further detail hereinbelow with reference to FIG. 2, in some embodiments, during use one or more of signal transmitters 20 and 24 transmit discrete signals according to a signal transmission schedule controlled by controller 40. The discrete signals can be used for determination of the indoor position of an object, as described, for example, in PCT publication WO2013/008169.

In some embodiments, a signal transmission schedule is provided to controller 40 via a control network. In some embodiments, receipt of a signal by one or more of signal receivers 30 and 34 is used to define times for transmission of a discrete signal by one or more of signal transmitters 20 and 24, for example as described in PCT publication WO2013/008169.

In some embodiments, in which the signal transmitter 20 is a WiFi signal transmitter and signal receiver 30 is a WiFi signal receiver, controller 40 is functionally associated with and controls both signal transmitter 20 and signal receiver 30 such that device 10 is configured to function as a WiFi access point, in addition to other functionalities.

Figure 1B:
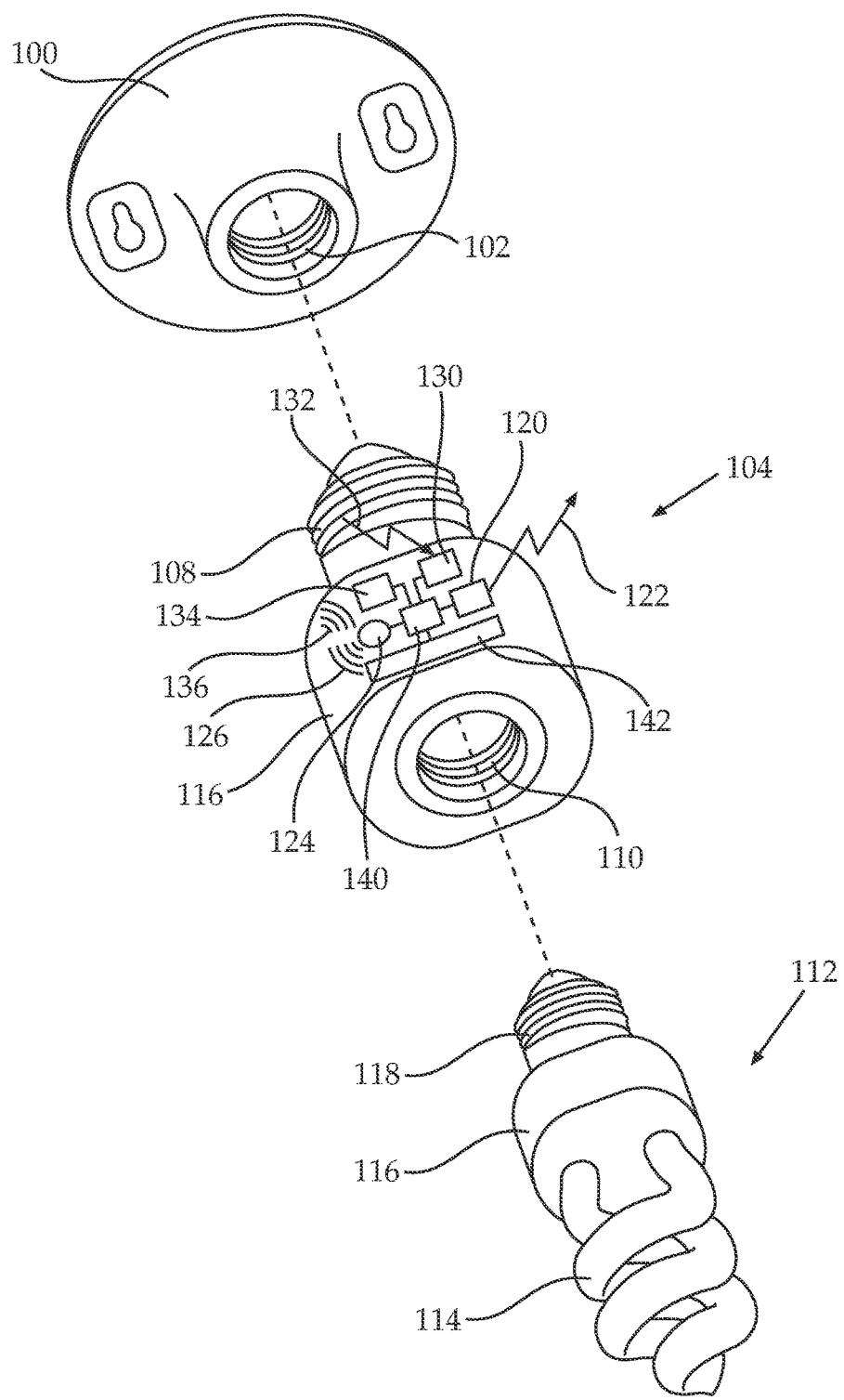
FIG. 1B is a schematic depiction of a device according to the teachings herein configured to be allow reversible connection of an electrical light-emitter thereto.

Reference is now made to FIG. 1B, which is a schematic depiction of an embodiment of a device 104 according to the teachings herein where the body of device 104 is configured to allow reversible connection of an electrical light-emitter 112 thereto, allowing electrical association of a connected light-emitter 112 with a light fixture 100 through device 104 to allow operation of light emitter 112. Device 104 can be considered as an adaptor configured to interpose between a light fixture such as 100 and a light emitter such as 112.

As seen in FIG. 1B, a standard prior art light fixture 100 includes a socket component of a standard E27 connector, threaded socket 102.

Device 104 according to the teachings herein also includes a body 106 and a base component of a standard E27 connector 108 configured for fitting device 104 in light fixture 100 by mating base 108 with socket 102.

Device 104 is further configured to be allow reversible connection of an electrical light-emitter 114 (such as light-bulb 112) thereto by including a socket component of a standard E27 connector, threaded socket 110, thereby configured to mate with base component of a standard E27 connector 118 of lightbulb 112, depicted in FIG. 1B as a Compact Fluorescent Light (CFL) bulb. Lightbulb 112 constitutes a light-emitter 114 configured to emit light to illuminate an area, a body 116 connected to light-emitter 114, and male component of a standard E27 threaded connector 118.

Although lightbulb 112 depicted in FIG. 1B is a CFL bulb, any suitable type of electrical light-emitter 114 may be used in accordance with the teachings herein. For example, light-emitter 114 may be an incandescent lightbulb, a halogen lightbulb, a fluorescent lamp, a compact fluorescent lamp (CFL), a cold cathode fluorescent lamp (CCFL), a high-intensity discharge lamp, a light-emitting diode (LED), or any other electrical lamp or lightbulb which emits light.

In the embodiment depicted in FIG. 1B, female threaded socket 102 of light fixture 100, male threaded connector 118 of lightbulb 112, male threaded connector 108 of device 104 and female threaded socket 102 of device 104 are all of the same type, a standard E27 connectors, so that it is possible to directly mate lightbulb 112 with fixture 100, in the usual way. Thus, device 104 is configured to serve as an interface between a light fixture having a fitting of a first type and a light-emitter having a fitting of a second type, the second type being the same as the first type.

In some embodiments, a device according to the teachings herein such as 104 is configured to serve as an interface between a light fixture having a fitting of a first type and a light-emitter having a fitting of a second type, the second type being different from the first type. In such embodiments, a device such as 104 serves as an interface between a light fixture such as 100 and a light emitter such as lightbulb 112, and enables using a light-emitter having a first type of fitting with a light fixture having a different type of fitting.

For example, female thread 102 of light fixture 100 may comprise an E27 screw base, whereas male thread 118 of lightbulb 112 is an E14 screw, such that thread 102 has a larger diameter than thread 118. In such embodiments, male thread 108 of device 104 is suited to female thread 102, and is an E27 screw, and female thread 110 of device 104 is suited to receive the thread diameter of lightbulb 112, and in the present example comprises an E14 screw base.

As another example, female thread 102 of light fixture 100 may comprise an E10 screw base, whereas male thread 118 of lightbulb 112 is an E14 screw, such that thread 102 has a smaller diameter than thread 118. In such embodiments, male thread 108 of device 104 is suited to female thread 102, and is an E10 screw, and female thread 110 of device 104 is suited to receive the thread diameter of lightbulb 112, and in the present example comprises an E14 screw base.

Physically associated with body 106 of device 104, is at least one signal transmitter, here shown as two signal transmitters: an electromagnetic radiation signal transmitter 120 configured to transmit a wireless electromagnetic radiation signal 122, and a sound source 124 configured to transmit a sound signal 126.

In some embodiments, physically associated with body 106 of device 104 is at least one signal receiver, here shown as a two signal receivers: an electromagnetic radiation signal receiver 130 configured to receive wireless electromagnetic radiation signals 132, and a sound receiver 134 configured to receive a sound signal 136.

Depending on the embodiments, electromagnetic radiation signal transmitter 120 and electromagnetic radiation receiver 130 together with a controller 140 may be configured to transmit/receive any type of electromagnetic radiation signals, including WiFi signals, Bluetooth® signals, infrared radiation signals, and radio signals.

In some embodiments, signal transmitters 120 and 124 are configured to broadcast universally-accessible (i.e. not addressed to a specific receiver) information-carrying signals. The broadcast signals may include information intended for recipients of the signals, such as advertisements, updates such as updates to train or flight schedules, or security notifications, for example provided by a local security authority or fire department.

In some embodiments, device 104 is configured so that a transmitted signal is transmitted by modulated visible light. In some such embodiments, device 104 is configured to modulate visible light emitted by lightbulb 112 by flickering, that is to say, varying the intensity of the light produced by lightbulb 112 as a function of time, periodically, or intermittently to carry desired information. Preferably, such flickering is of sufficiently low amplitude and sufficiently rapid rate to not be a nuisance or cause irritation to people in the vicinity of lightbulb 112, but is detectable by a suitable light detector (e.g., a cameras) to allow acquisition of data from the modulated light signal, for example by a camera of a smartphone. Controller 140, mounted onto or within body 106, is configured to control the operation of lightbulb 112, signal transmitters 120 and 124, and signal receivers 130 and 134. In some embodiments, controller 140 is configured to receive a control command from a control network (not shown). In some embodiments, the control network is a Phase Locked Loop (PLL). In some embodiments the control network is a wireless communication network, such as a WiFi network, a Bluetooth® network, or a GSM network, a LTE network, a WiMax network, a DECT network, or a WCDMA network.

In some embodiments, an operator transmits the control command over the control network to controller 140. In some embodiments, controller 140 receives suitable control commands from signals received over the control network, for example when a different device such as 104 in the network transmits a control command to controller 140 of device 104.

Typical such commands include command for activating or deactivating lightbulb 112. In some embodiments, such commands comprise commands for synchronizing one or more of signal transmitters 120 and 124 with at least one other signal transmitter (e.g., of different device similar to 104) controlled by the network. In some embodiments, such commands comprises a command for changing the transmission schedule of signals transmitted by one or both of transmitters 120 and 124. In some embodiments, such commands comprise commands for changing the identifier or profile of the device 104 in the network. In some embodiments, such commands comprise commands for troubleshooting or diagnostics of device 104 or lightbulb 112.

In some embodiments, device 104 also comprises an electricity storage unit (energy source) 142, such as a battery, mounted onto or within body 106, and configured to supply electrical power to signal transmitters 120 and 124, signal receivers 130 and 134, and controller 140, particularly at times when electrical current provided by light fixture 100 is unavailable, such as during a power outage.

As will be described in further detail hereinbelow with reference to FIG. 2, in some embodiments, during use one or more of signal transmitters 120 and 124 transmit discrete signals according to a signal transmission schedule controlled by controller 140. The discrete signals can be used for computation of the indoor position of an object, as described, for example, in PCT publication WO2013/008169.

In some embodiments, a signal transmission schedule is provided to controller 140 via a control network. In some embodiments, receipt of a signal by one or more of signal receivers 130 and 134 is used to define times for transmission of a discrete signal by one or more of signal transmitters 120 and 124, for example as described in PCT publication WO2013/008169.

In some embodiments, in which the signal transmitter 120 is a WiFi signal transmitter and signal receiver 130 is a WiFi signal receiver, controller 140 is functionally associated with and controls both signal transmitter 120 and signal receiver 130 such that device 104 is configured to function as a WiFi access point, in addition to other functionalities.

Figure 2:
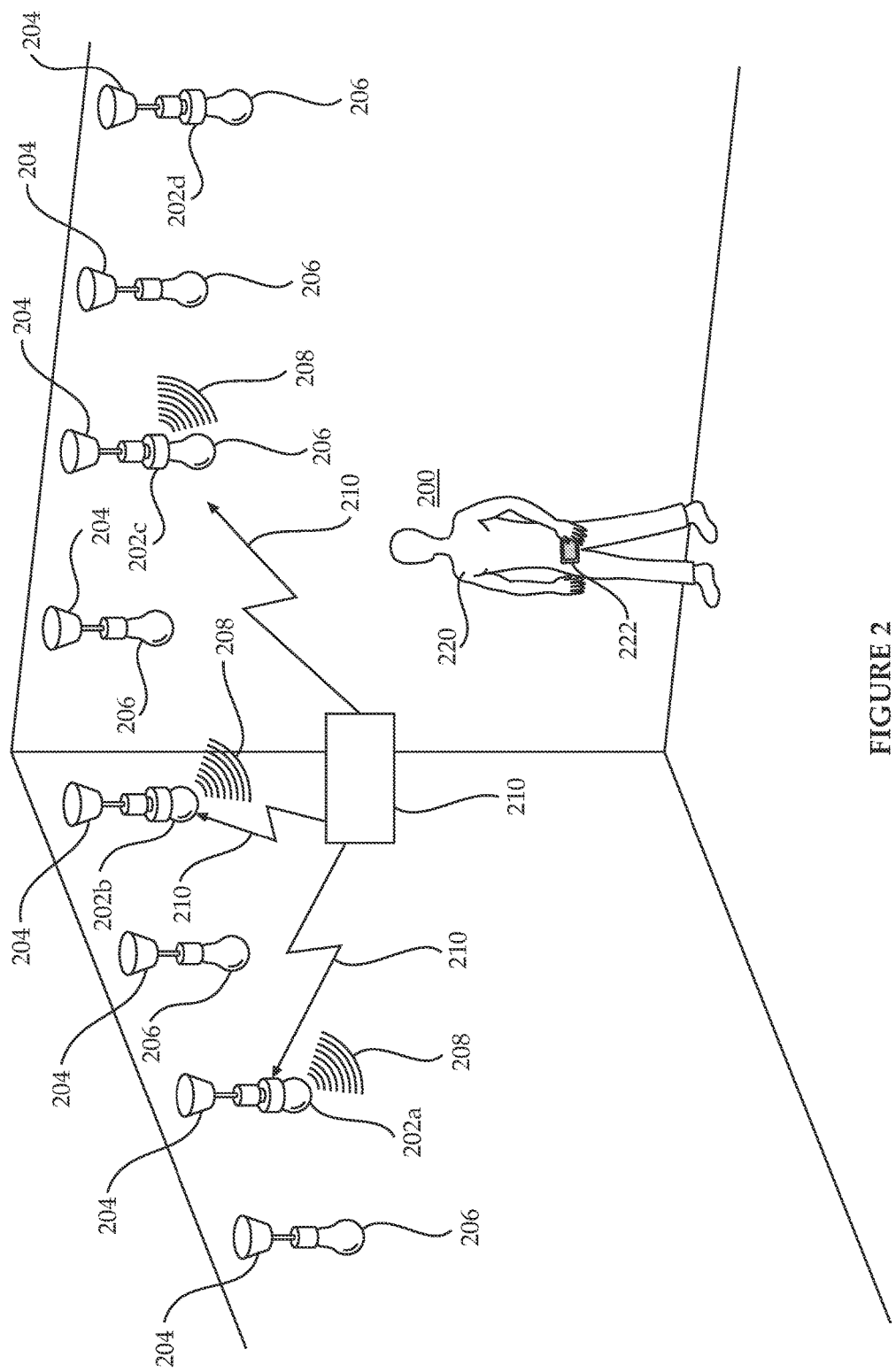
FIG. 2 is a schematic depiction of an embodiment of deployment of devices according to the teachings herein in a specified area\, together constituting at least a part of a network infrastructure and/or at least part of a system useful for location determination in the area.

Reference is now made to FIG. 2, which is a schematic depiction of an embodiment of the teachings herein, a specified area, room 200, in which four devices 202 according to the teachings herein are deployed by reversible connection to ordinary light fixtures 204 of room 200 in the manner of standard lightbulbs.

Devices 202 together constitute a portion of a network infrastructure in room 200 according to the teachings herein, suitable for implementing the teachings of PCT publication WO2013/008169.

Devices 202 together constitute at least part of a system for location determination, according to the teachings herein, suitable for implementing the teachings of PCT publication WO2013/008169.

As seen in FIG. 2, there are eight ordinary pre-existing light fixtures 204 (each comprising an E27 socket) in room 200, that make up a part of the physical structure of room 200 for the purpose of allowing illumination of room 200.

Connected to four of light fixtures 204 are standard prior art 60 W incandescent E27 lightbulbs 206. Connected to the other four of light fixtures 204 are devices 202. Connection of lightbulbs 206 and devices 202 to light fixtures 204 is in the usual way by mating of the E27 socket of a light fixture 204 with the E27 base of a lightbulb 206 or a device 202.

Devices 202a and 202b are substantially identical to device 10 depicted in FIG. 1A, except that devices 202a and 202b include an incandescent (and not CFL) light-emitter as an integral part thereof.

Devices 202c and 202d are substantially identical to device 104 depicted in FIG. 1B. Connected to each one of devices 202c and 202d through respective sockets 110 are standard prior art 60 W incandescent E27 lightbulbs 206.

The light-emitters of lightbulbs 206 and of devices 202a and 202b are operated in the usual way to illuminate room 200. Lightbulbs 206 connected to devices 202c and 202d as well as the light emitters of devices 202a and 202b are optionally controlled (e.g., turned on and off, dimmed) through a respective controller (40 or 140) of a device 202. Diagnostics and malfunction of lightbulbs 206 connected to devices 202c and 202d as well as the integral light emitters of devices 202a and 202b is optionally reported through a network which includes devices 202.

As discussed hereinabove with reference to FIGS. 1A and 1B (for example to implement a network or the teachings of PCT publication WO2013/008169), one or more signal transmitters (20, 24, 120, 124) of devices 202a, 202b, and 202c, occasionally (periodically or intermittently) transmit signals into room 200 based on a signal transmission schedule. In the embodiment depicted in FIG. 2, devices 202a, 202b and 202c are depicted transmitting sound signals 208 into room 200 from signal transmitters 24 and 124 in order to implement location determination according to PCT publication WO2013/008169. In the embodiment depicted in FIG. 2, device 202d is part of the network as a reserve device and does not transmit signals except as required to maintain the network.

Depending on the embodiments, none, one or more than one of devices 202 in room 200 also function as WiFi access points in the usual way.

In some embodiments, the signal transmitting schedule of devices 202 is synchronized based on the phase defined by the Phase-Locked Loop (PLL) of the devices 202, and is controlled by a respective controller (40 or 140) of each device 202.

In some embodiments, the signal transmitting schedule of devices 202 is synchronized based on a synchronizing signal 210 received by a signal receiver (30, 34, 130, 134) of each device 202. In the embodiment depicted in FIG. 2, synchronizing signals 210 are wireless electromagnetic radiation signals transmitted by a synchronizer 212 located in room 200, similar to that described in PCT publication WO2013/008169, and are received by electromagnetic signal receivers 30 and 130 of devices 202.

In some embodiments, the signal transmitting schedule of devices 202 is synchronized using synchronizing protocols known in the art, such as IEEE 1588. In some such embodiments, devices 202 share a common clock, such as a GNSS clock, and the clock is used for accurate synchronization based on a synchronization protocol.

As depicted in FIG. 2, a user 220 located in room 200 and holding a suitably configured mobile device 222, for example as described in PCT publication WO2013/008169, operates mobile device 222 to receive signals 208 transmitted by devices 202 and to use the received signals to compute an own position in room 200, for example as described in PCT publication WO2013/008169.

In some embodiments, an operator may use mobile device 222 to transmit commands to a controller of one or more of devices 202, via the PLL network or via a signal which is received by one or more signal receivers of devices 202.

In some embodiments, if one of devices 202a, 202b or 202c is no longer able to function sufficiently-well as an active part of the network due to malfunction or other reason, the network is configured to replace the device with a different device. For example, if device 202a malfunctions, the network can replace device 202a with device 202d.

Depending on the embodiments, identification of a device having insufficient function is identified by the network (e.g., the device does not respond to queries) and/or by the device self-reporting using one or both of signal transmitters (20, 24, 120, 124).

In order to ensure that the replacement device 202d functions as did now-replaced device 202a, the network profile formerly associated with device 202a is transmitted to controller 140 of replacement device 202d, depending on the embodiments, via the PLL, via a signal received by any one of the signal receivers (130, 134) of replacement device 202d, or via any other network which communicates with controller 140 of replacement device 202d.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

What is claimed is:

1. A device suitable for connecting to a light fixture, comprising:
   a body configured to electrically connect said device to a light fixture;
   an electrical light emitter;
   at least one Wi-Fi signal transmitter;
   at least one Wi-Fi signal receiver; and
   a controller configured to operate said device as a Wi-Fi access point of a Wi-Fi network by controlling said at least one Wi-Fi signal transmitter and said at least one Wi-Fi signal receiver, and
   wherein said controller controls the operation of said electrical light emitter to generate encoded information-carrying light signals by modulation of light emitted by said electrical light emitter, based on information received over said Wi-Fi network.

2. The device of claim 1, comprising a base configured to reversibly connect said body with a socket of a light fixture.

3. The device of claim 2, wherein said base is selected from the group consisting of a screw-connector base, an Edison-screw base, a bayonet connector base, a bipin connector base and a wedge base.

4. The device of claim 1, wherein said encoded light signal is suitable for use in implementing an indoor positioning method in an area in the vicinity of said body.

5. The device of claim 1, wherein said controller controls said Wi-Fi signal transmitter to transmit signals suitable for use in implementing an indoor positioning method in an area in the vicinity of said body.

6. The device of claim 1, further comprising a sound source, wherein said controller is configured to control the sound source to generate a sound signal.

7. The device of claim 1, wherein said controller acts upon a command received by said at least one Wi-Fi receiver for controlling a connected electrical light-emitter and/or said at least one Wi-Fi signal transmitter via a control network.

8. The device of claim 7, wherein said control network is a wireless control network selected from a list of a WiFi network, a Bluetooth® network, a GSM network, a LTE network, a WiMax network, a DECT network, or a WCDMA network.

9. The device of claim 7 or 8, wherein said controller further receives a signal transmission schedule via said control network;
Wherein said signal transmission schedule is used to define times for transmission of a discrete signal by said Wi-Fi transmitter.

10. The device of claim 1, further comprising a battery mounted onto or within said body; wherein said battery is configured to supply electrical power to said at least one Wi-Fi transmitter and/or said at least one Wi-Fi receiver and/or said controller.

11. The device of claim 1, wherein said electrical light-emitter is selected from the group of light-emitters consisting of incandescent, halogen, fluorescent, compact fluorescent (CFL), cold cathode fluorescent lamp (CCFL), high-intensity discharge, solid state lighting (SSL) and light-emitting diode (LED) light emitters.

12. A network infrastructure in an area, comprising:
at least two devices according to claim 1, where each said device is connected to a different light fixture located in said area.

13. The network infrastructure of claim 12, wherein said light fixture is a pre-existing light fixture.

14. The network infrastructure of claim 12, wherein said area is an indoor area selected from a group consisting of a warehouse, a supermarket, a convention center, a mall, an indoor parking garage, or an airport.

15. A method for deploying a Wi-Fi network infrastructure in an area, comprising:
providing at least two devices according to claim 1, suitable for connection to a light fixture; and
electrically connecting said devices to at least two spaced-apart light fixtures in said area forming a part of said Wi-Fi network infrastructure.

16. A system for location determination in an area, comprising:
at least two devices according to claim 1, suitable for connection to a light fixture, wherein said at least two devices are deployed in an area by electrical connection to at least two spaced-apart light fixtures located in said area.

17. A method for location determination in an indoor area, comprising:
receiving at least two signals from at least two devices according to claim 1;
determining location based on said at least two signals.

18. The device of claim 1, wherein said modulation comprises flickering.

19. The device of claim 1, wherein said controller comprises a processor configured to store data, and wherein said processor transmits said stored data by said light modulation.

20. The device of claim 1, wherein said encoded information-carrying light signals are universally-accessible information-carrying signals.

* * * * *